United States Patent
Zhang et al.

(10) Patent No.: US 8,902,526 B2
(45) Date of Patent: Dec. 2, 2014

(54) RECORDING MEDIUM

(71) Applicant: Agency for Science, Technology and Research, Singapore (SG)

(72) Inventors: Jingliang Zhang, Singapore (SG); Zhimin Yuan, Singapore (SG); Bo Liu, Singapore (SG); Lin Lin Thi @ HTWE Htwe Yee, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 13/684,039

(22) Filed: Nov. 21, 2012

(65) Prior Publication Data

US 2013/0128386 A1 May 23, 2013

(30) Foreign Application Priority Data

Nov. 21, 2011 (SG) ................ 201108626-1

(51) Int. Cl.
*G11B 5/09* (2006.01)
*G11B 21/02* (2006.01)
*G11B 5/82* (2006.01)
*G11B 5/596* (2006.01)

(52) U.S. Cl.
CPC .............. *G11B 5/82* (2013.01); *G11B 5/59688* (2013.01)

USPC ................................. 360/48; 360/75

(58) Field of Classification Search
None
See application file for complete search history.

(56) References Cited

U.S. PATENT DOCUMENTS 6,873,482 B1 * 3/2005 Hsieh et al. .................... 360/48
7,916,415 B1 * 3/2011 Chue ............................. 360/48

* cited by examiner

*Primary Examiner* — Andrew L Sniezek
(74) *Attorney, Agent, or Firm* — Blakely, Sokoloff, Taylor & Zafman LLP

(57) ABSTRACT

In various embodiments, a recording medium having a servo layer configured to provide servo information and a data recording layer configured to record data, wherein the medium comprises a plurality of servo patterns and a plurality of data segment in one sector, each data segment corresponding to each of the plurality of servo patterns, wherein the plurality of servo patterns comprises a first servo pattern comprising an automatic gain control, a second servo pattern comprising a sector address mark, a third servo pattern comprising a GrayCode, and a fourth servo pattern comprising a plurality of servo bursts, wherein the data recording layer is configured to record the data on the data segments corresponding to the first, second, third and fourth servo patterns.

4 Claims, 9 Drawing Sheets

PRIOR ART

PRIOR ART

PRIOR ART

PRIOR ART

RECORDING MEDIUM

CROSS-REFERENCE TO RELATED APPLICATION

This application claims the benefit of priority of Singapore patent application No. 201108626-1, filed 21 Nov. 2011, the content of it being hereby incorporated by reference in its entirety for all purposes.

TECHNICAL FIELD

Various aspects of this disclosure relate to recording media.

BACKGROUND

In conventional hard disks having a rotating magnetic medium, there is only one magnetic layer to record data. As such, the servo pattern information is recorded in servo wedges. This is illustrated in FIG. 1. FIG. 2A is a schematic showing the layout of servo information and data. FIGS. 2B, 2C and 2D are schematics showing a more detailed layout of servo information. As illustrated in FIG. 1 and FIGS. 2A-D, servo pattern information is stored between data areas for user data.

FIG. 3 a schematic showing a servo control system accessing a conventional data arrangement system in a conventional magnetic medium. The servo pattern information is accessed by the read/write head. The data is the transmitted to the preamplifier 302 and then to the auto gain control (AGC) 304. The analog signals are digitized by the analog to digital converter (ADC) 306. The digital signal is then transmitted to a position error signal (PES) demodulator 308 and compared with a reference signal to generate a position error signal. The ADC and PES demodulator are driven by timing recovery circuit 310. The position error signal (PES) provides an indication of whether the read/write head is off-track from the centre of the targeted track. The position error signal (PES) is provided to a controller 312 which then controls actuator driver 314 to position the read/write head on track.

For a servo control system such as that shown in FIG. 3, the position of the read/write head to be moved is obtained from the servo information stored in servo wedges. The sampling frequency of the servo control system is thus limited by the number of servo wedges in one revolution, and the rotating speed of disk. To improve the servo performance, such as tracking accuracy for high track density drive, a higher sampling rate is needed, which in turn requires more servo wedges to be placed in the magnetic layer. However, this will cause less data sector to be available for recording the user data. This is undesirable.

SUMMARY

Various aspects of this disclosure provide a recording medium that is able to address at least partially the above-mentioned challenges.

In various embodiments, a recording medium having a servo layer configured to provide servo information and a data recording layer configured to record data, wherein the medium comprises a plurality of servo patterns and a plurality of data segment in one sector, each data segment corresponding to each of the plurality of servo patterns, wherein the plurality of servo patterns comprises a first servo pattern comprising an automatic gain control, a second servo pattern comprising a sector address mark, a third servo pattern comprising a GrayCode, and a fourth servo pattern comprising a plurality of servo bursts, wherein the data recording layer is configured to record the data on the data segments corresponding to the first, second, third and fourth servo patterns.

BRIEF DESCRIPTION OF THE DRAWINGS

The invention will be better understood with reference to the detailed description when considered in conjunction with the non-limiting examples and the accompanying drawings, in which.

DETAILED DESCRIPTION

Figure 1:
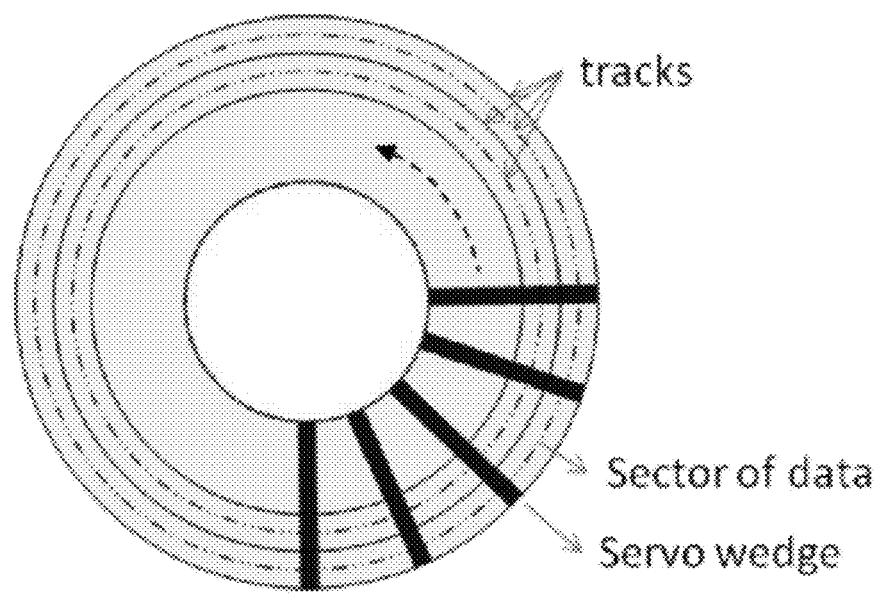
FIG. 1 is a schematic of a conventional data arrangement system in a conventional magnetic medium.
Figure 2A:
FIG. 2A is a side view of a schematic illustrating a conventional data arrangement system.
Figure 2B:
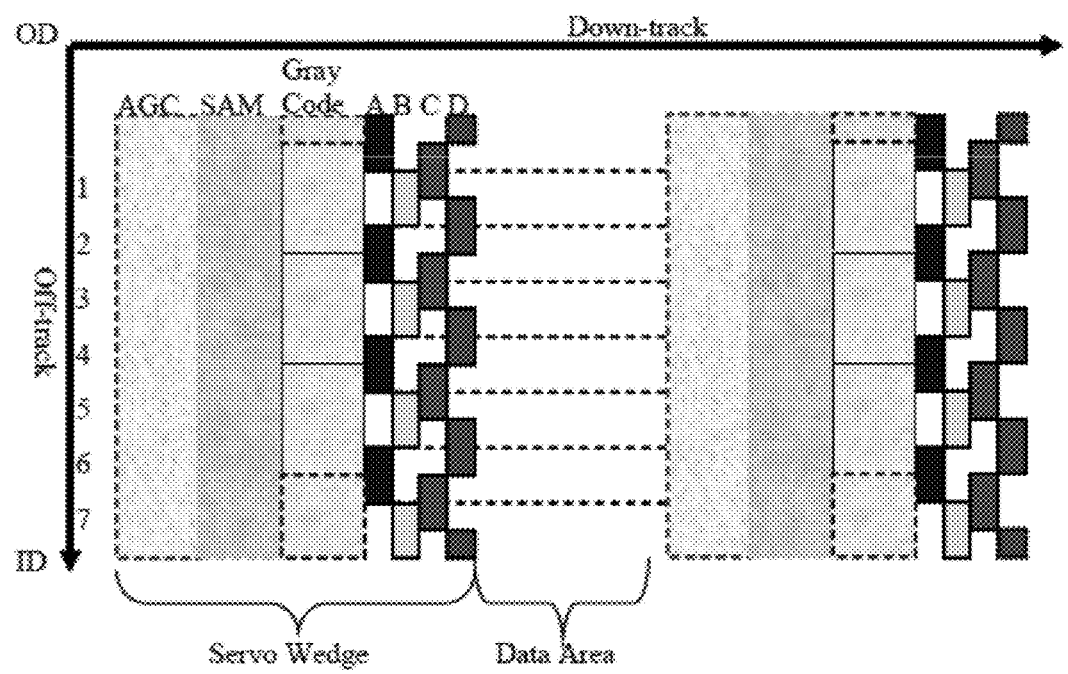
FIG. 2B is a top view of a detailed schematic illustrating the layout of servo information or servo pattern in a conventional data arrangement system.
Figure 2C:
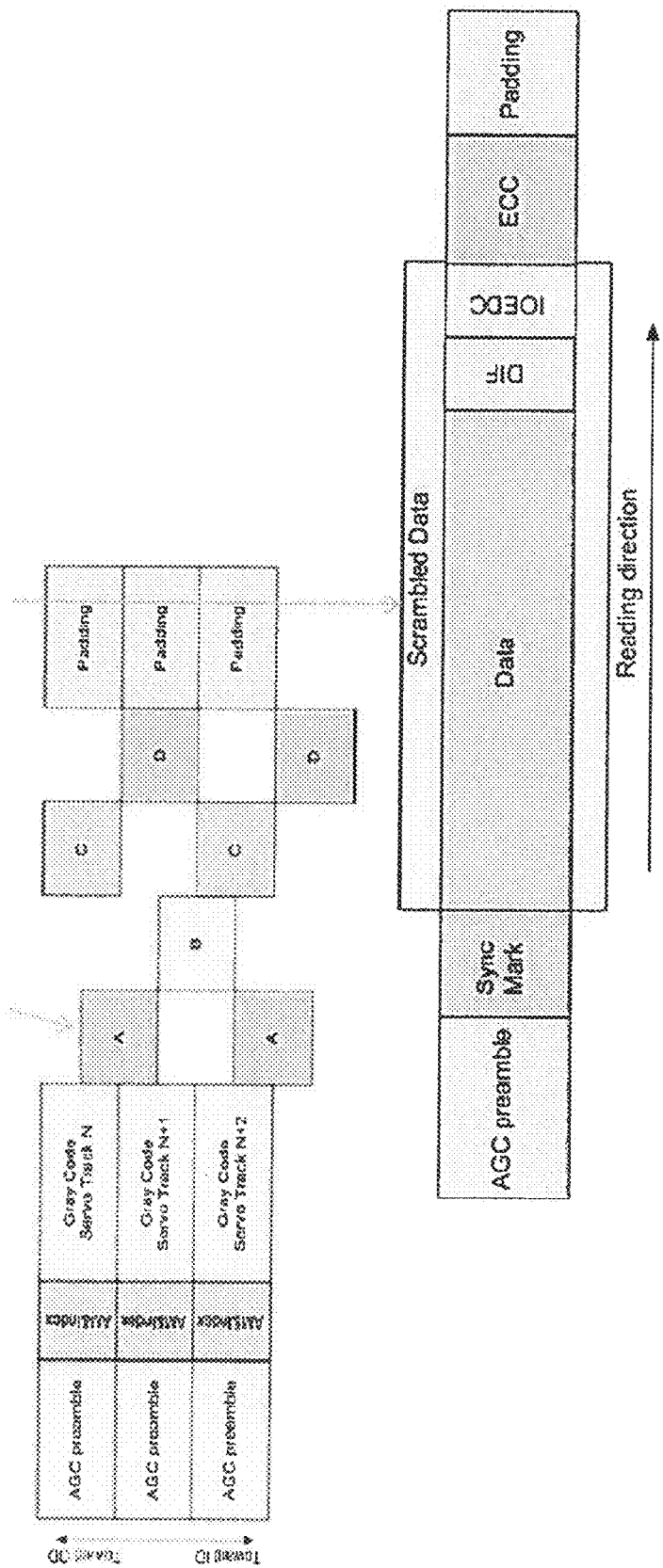
FIG. 2C is a top view of a detailed schematic illustrating the layout of servo information or servo pattern and data sectors in a conventional data arrangement system.
Figure 2D:
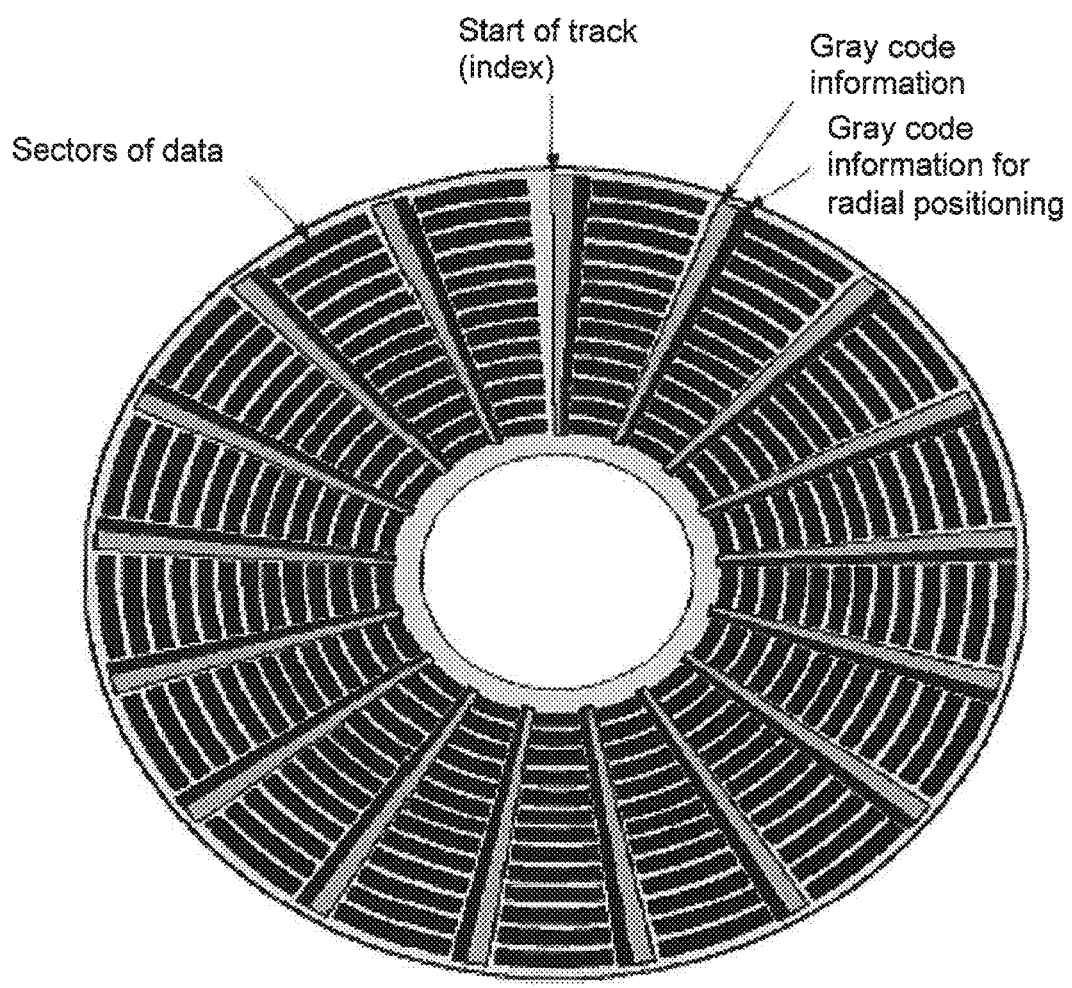
FIG. 2D is a schematic illustrating the layout of a conventional data arrangement system in a magnetic medium.
Figure 3:
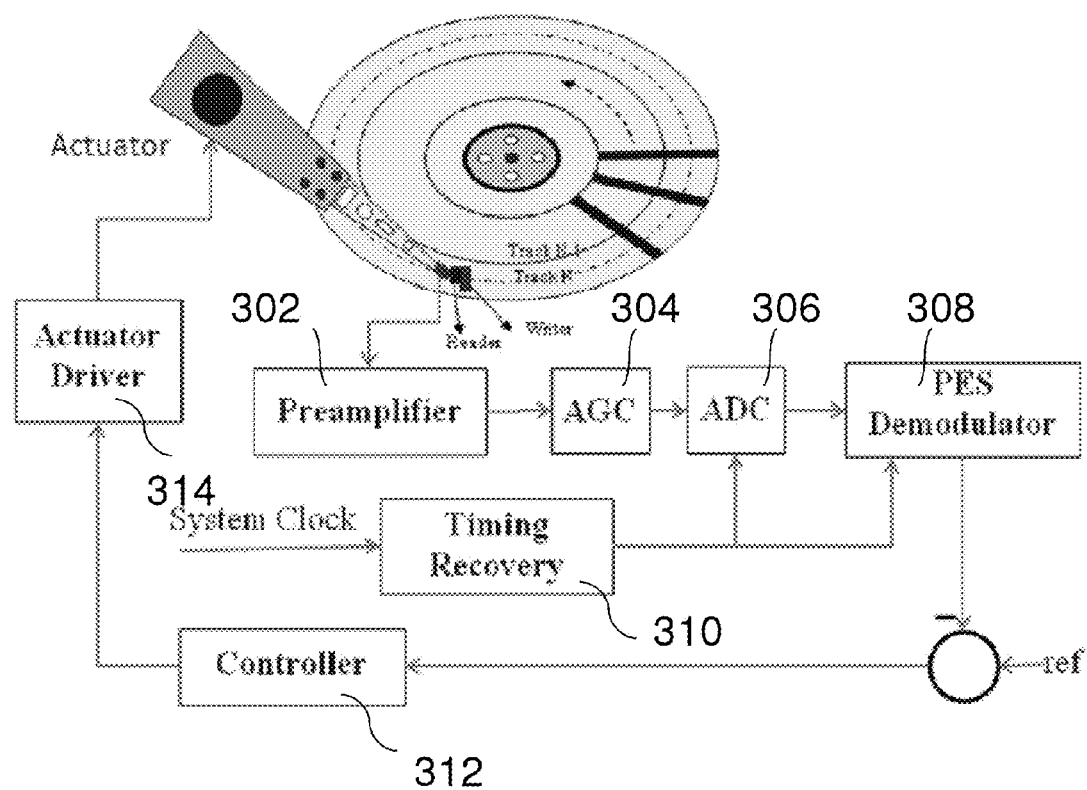
FIG. 3 is a schematic showing a servo control system accessing a conventional data arrangement system in a conventional magnetic medium.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In order that the invention may be readily understood and put into practical effect, particular embodiments will now be described by way of examples and not limitations, and with reference to the figures.

In various embodiments, a method of arranging data in a recording medium including recording data in a first layer or data recording layer of the medium and recording at least a portion of servo pattern information in a second layer or servo layer of the magnetic medium, wherein the first layer and the second layer forms a stacked arrangement.

In various embodiments, a recording medium having a first layer or data recording layer configured to record data and a second layer or servo layer of the medium configured to record at least a portion of servo pattern information, wherein the first layer and the second layer forms a stacked arrangement.

The medium may be a magnetic medium. The first layer or data recording layer may be a magnetic or more specifically a ferromagnetic layer. The second layer or servo layer may be a magnetic or more specifically a ferromagnetic layer. The servo pattern information may comprise a plurality of servo patterns. The first magnetic layer and the second magnetic layer may form a single monolithic structure. Further, the first magnetic layer and the second magnetic layer may be put on the same side of a disk platter and they may be read and/or processed together.

In other words, a magnetic medium comprising two layers may be used to store information. One of the layers is stacked on top of the other layer. The first layer (which may alternatively be called the data recording layer) is used to store user data. A portion of the servo information is stored in the second layer (which may alternatively be called the servo layer).

In this manner, the servo pattern information may be sampled at a higher rate or continously. This helps to address at least some of the abovementioned challenges.

In various embodiments, a data storage device comprising the recording medium.

In various embodiments, the servo pattern information may be sampled such that a continuous signal consisting of a position error signal (PES) over a whole data sector as well as addressing information may be obtained from a PES demodulator. A position error signal (PES) provides information on how well a read/write head is following a target track along the magnetic medium. In various embodiments, the servo pattern information may be sampled at more than 500 MHz or more than 1000 MHz.

Figure 4:
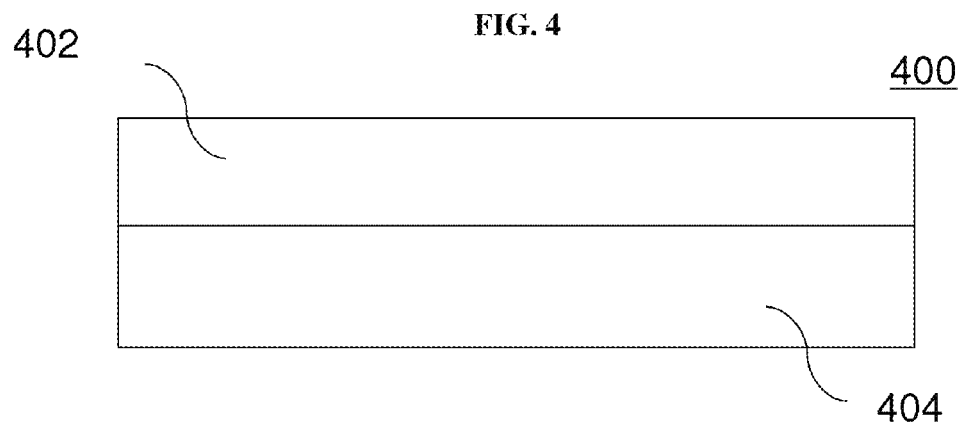
FIG. 4 shows a side cross sectional illustration of a magnetic medium according to various embodiments.

FIG. 4 shows a side cross sectional illustration of a magnetic medium 400 according to various embodiments. Various embodiments relate to a medium 400 having a first layer or data recording layer 402 and a second layer or servo layer 404, wherein the first layer 402 and the second layer 404 form a stacked arrangement. The first layer or data recording layer 402 may be stacked on the second layer or servo layer 404. The first magnetic layer 402 and the second magnetic layer 404 may form a single monolithic structure.

In various embodiments, the first layer or data recording layer 402 is on the second layer or sevo layer 404 such that the first layer 402 or data recording layer is configured to be positioned closer to a read/write head compared to the second layer or servo layer 404 during operation. There may be less spacing loss when a layer is positioned closer to the read/write head during operation. As such, the first layer or data recording layer 402 which is used to record user data may be positioned near the read / write head so it can support a higher linear density.

In various embodiments, the second magnetic layer or servo layer 404 has a higher coercivity value compared to the first magnetic layer or data recording layer 402. By doing so, the portion of servo pattern information stored on the second magnetic layer may not be erased during writing of data to the first magnetic layer or data recording layer 402.

Figure 5:
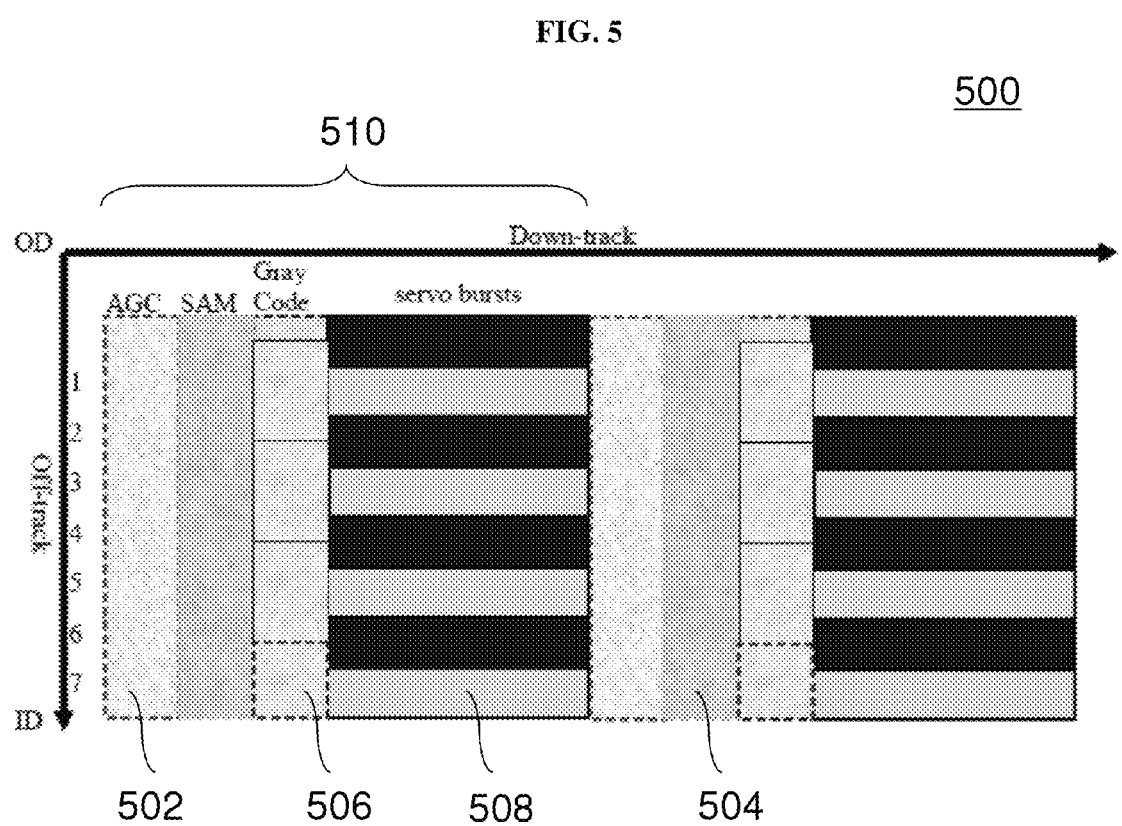
FIG. 5 is a top view of a schematic illustrating a data arrangement system according to various embodiments.

FIG. 5 is a schematic illustrating a data arrangement system according to various embodiments. As shown in FIG. 5, servo pattern information 500 is not interposed with user data but instead may be accessed continuously. The servo pattern information 500 may include a plurality of servo sectors 510, each servo sector 510 having a first servo pattern comprising auto gain control (AGC) 502, a second servo pattern information comprising sector address mark (SAM) 504, a third servo pattern information comprising GrayCode 506 and a fourth servo pattern information comprising servo bursts 508. The auto gain control (AGC) 502, sector address mark (SAM) 504 and gray code 506 are addressing information.

Additional recording layer storage space is freed up in the medium according to various embodiments thereby improving the surface utilization rate for the first magnetic layer or data recording layer because, with the removal of the servo burst sectors from the recording layer, additional portions of the recording layer dedicated to automatic gain control (AGC) signals and servo control signals are no longer needed. Conventional disk drives use automatic gain control to establish a reference for servo burst amplitude detection and servo control. The servo layer removes the necessity of these signals.

However, the automatic gain control (AGC) may also be used to establish a feedback clock signal for synchronization of media read and write operations to minimize the effect of spindle speed fluctuation. The AGC may be used to normalize the amplitude of the read-back signal for the gray code detector and the sector address mark (SAM) detector. The SAM provides the down-track information which tells the number of servo sectors that read/write head has crossed. The GrayCode indicates the servo track number that read/write head is following. All servo sectors on a servo track have the same servo track number encoded.

In various embodiments, the portion of servo pattern information stored in the second magnetic layer or servo layer comprises servo bursts. The servo burst may be of the AB burst type, the ABCD burst type, the A/B frequency burst type or any other suitable servo burst type.

Servo bursts are used by the PES demodulator to generate the PES signal. The PES signal provides information on how well a read/write head is following a target track along the magnetic medium. The PES signal is used by servo control system to generate a fine position error feedback signal to correct any misalignment of the read/write head from the track center of the target track. There are various types of servo bursts. One type of servo bursts is ABCD consisting of A, B, C, and D bursts. Another type of servo burst is AB bursts consisting of A and B bursts. The bursts in either servo burst types are located at different off-track positions and different down-track positions. When the read/write head pass through a track, different signals are generated by the different bursts in different off-track positions. By monitoring the amplitudes of the different signals, the servo control system will know the position of the read/write head in relation to the track center of the targeted track. The signals are provided to the PES demodulator. The timing recovery circuit may be used to distinguish the signals due to different bursts. Another servo burst type is phase/frequency A/B servo bursts. The A and B bursts are located at different off-track positions but at the same down-track positions. In the frequency A/B servo burst type, the A and B servo bursts are differentiated by different phases/frequenices. A frequency domain filter or matching filter is used to distinguish the signals due to different bursts. The servo bursts may be a dual frequency or triple frequency servo bursts.

Since the servo bursts are stored on the second layer or servo layer, the servo layer or second layer in accordance with various embodiments advantageously allows writing continuous servo bursts or as many servo bursts as needed such that a continuous position error signal (PES) or PES of high sample rate may be generated for servo control mechanism.

Figure 6A:
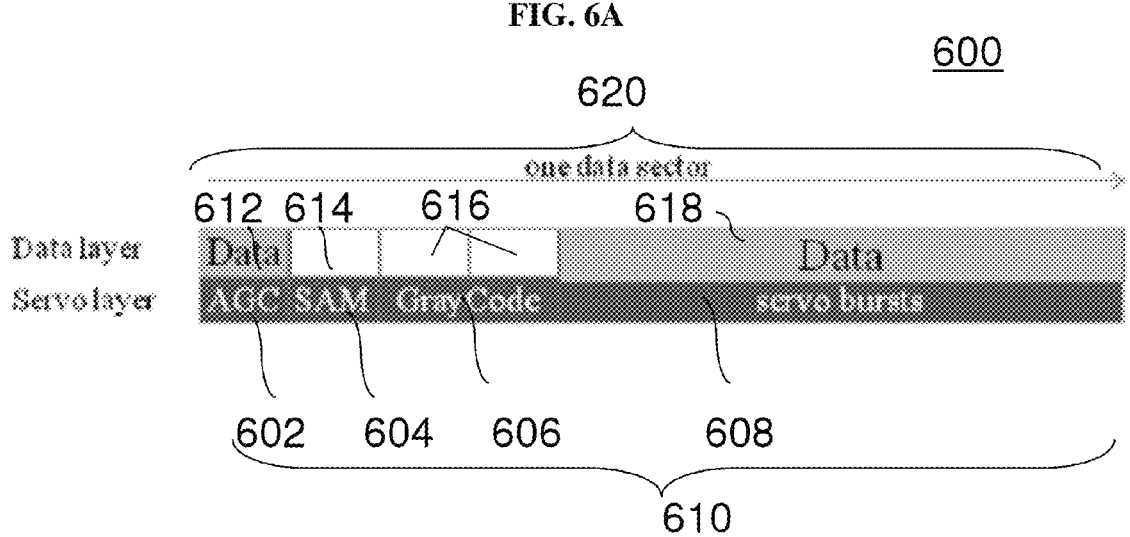
FIG. 6A and 6B are side views of schematics illustrating data arrangement systems according to various embodiments.
Figure 6B:
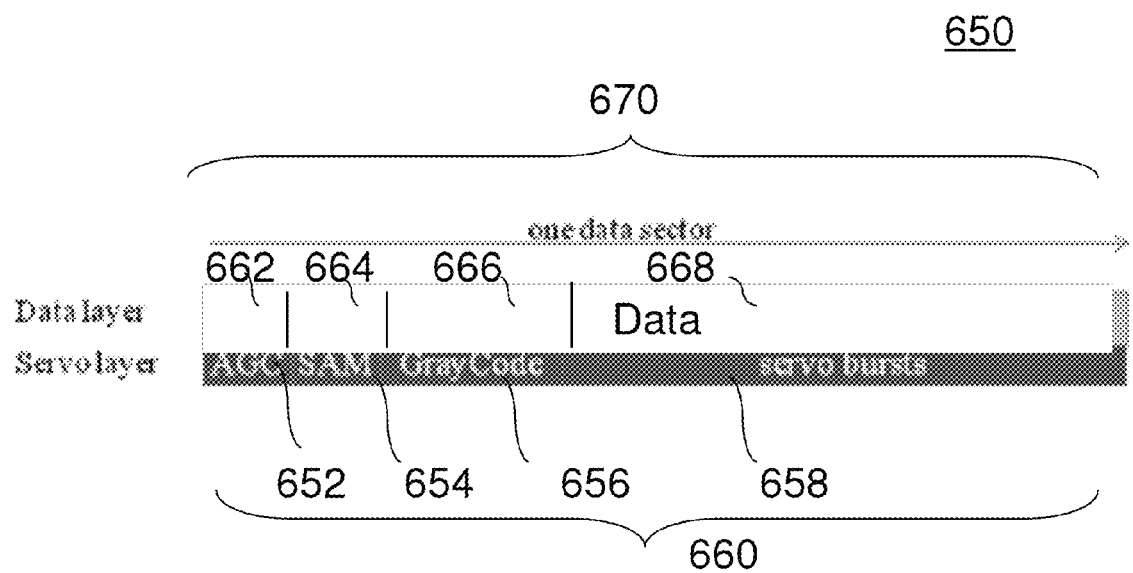

In various embodiments, the portion of servo pattern information stored in the second layer further comprises addressing information such as auto gain control (AGC), sector address mark (SAM) and GrayCode. In various embodiments, all the servo pattern information may be stored in the second layer or servo layer. FIGS. 6A and 6B show schematics in which all the servo pattern information are stored in the second layer or servo layer according to various embodiments.

FIG. 6A shows a schematic in which the auto gain control (AGC) 602, sector address mark (SAM) 604, GrayCode 606 are stored in the servo layer according to various embodiments and portions of the data layer corresponding to portions of the servo layer stored with sector address mark (SAM) and GrayCode 614 and 616 are reserved to be blank or written with the same data as those on the servo layer. Each sector 600 comprises a servo sector 610 having a plurality of servo patterns 602, 604, 606, 608 and a data sector 620 having data segments 612, 614, 616 and 618 corresponding to the servo patterns. For instance, data segment 612 corresponds to servo pattern 612.

In the present context, a portion of the data layer corresponding to a portion of the servo layer refers to the portion of the data layer adjacent to the portion of the servo layers or the portion of the data layer separated from the portion of the servo layer only by one or more intermediate layer. In other words, a segment or data segment corresponding to a servo pattern means that the segment or data segment is immediately above or below the servo pattern or that the servo pattern is separated from the segment or data segment by only one or more intermediate layers.

In various embodiments, a recording medium having a servo layer configured to provide servo information and a data recording layer configured to record data, wherein the medium comprises a plurality of servo patterns and a plurality of data segments in one sector 600, each data segment corresponding to each of the plurality of servo patterns, wherein the plurality of servo patterns comprises a first servo pattern comprising an automatic gain control 602, a second servo pattern comprising a sector address mark 604, a third servo pattern comprising a GrayCode 606, and a fourth servo pattern comprising a plurality of servo bursts 608, wherein the data recording layer is configured to record the data only on the data segments corresponding to the first and fourth servo patterns 612 and 618. In other words, the portions of the first layer corresponding to the portions of the second layer having the SAM 604 and gray code 606 may be left blank/without being overwritten. Advantageously, interference from the first layer due to data stored when the SAM and gray code are accessed may be reduced. Alternatively, data segment 614 above the second servo pattern 604 may also comprise the same servo information as the second servo pattern 604. Data segment 616 above the third servo pattern 606 may also comprise the same servo information as the servo pattern 606.

The plurality of servo bursts may forms a AB servo burst type, a ABCD servo burst type or a A/B frequency servo burst type. The servo bursts may be a dual frequency or triple frequency servo bursts.

In various embodiments, a recording medium having a servo layer configured to provide servo information and a data recording layer configured to record data, wherein the medium comprises a plurality of servo patterns and a plurality of data segments in one sector 650, each data segment corresponding to each of the plurality of servo patterns, wherein the plurality of servo patterns comprises a first servo pattern comprising an automatic gain control 652, a second servo pattern comprising a sector address mark 654, a third servo pattern comprising a GrayCode 656; and a fourth servo pattern comprising a plurality of servo bursts 658, wherein the data recording layer is configured to record the data on the data segments 662, 664, 666 and 668 corresponding to the first, second, third and fourth servo patterns.

Figure 8:
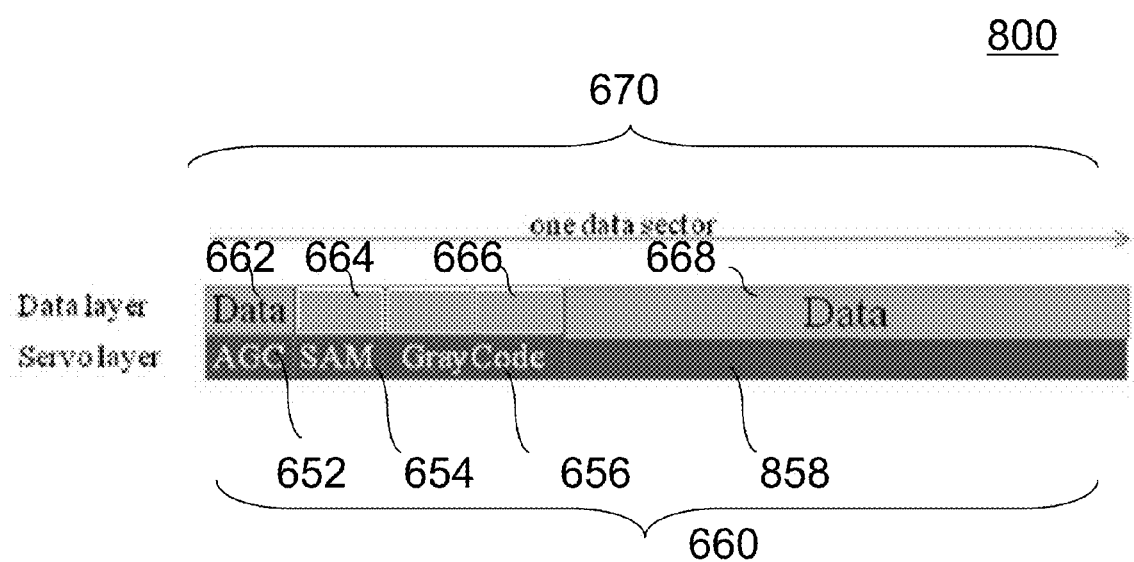
FIG. 8 is a side view of a schematic illustrating a data arrangement system according to various embodiments.

In other words, a portion of the first layer corresponding to a portion of the second layer stored with sector address mark (SAM) 664 and gray code 666 may be used to store information. Advantageously, this will reduce the wastage of the data area. However, there may be interference from the data stored in the corresponding portion of the first layer when the sector address mark (SAM) and gray code are accessed. FIG. 8 shows the recording medium wherein the plurality of servo bursts forms a A/B frequency burst type 858.

In various embodiments, a further portion of servo pattern information comprising auto gain control (AGC), sector address mark (SAM) and gray code in the first layer or data layer. In various embodiments, the servo pattern information is recorded in different magnetic layers of a magnetic medium.

Figure 7:
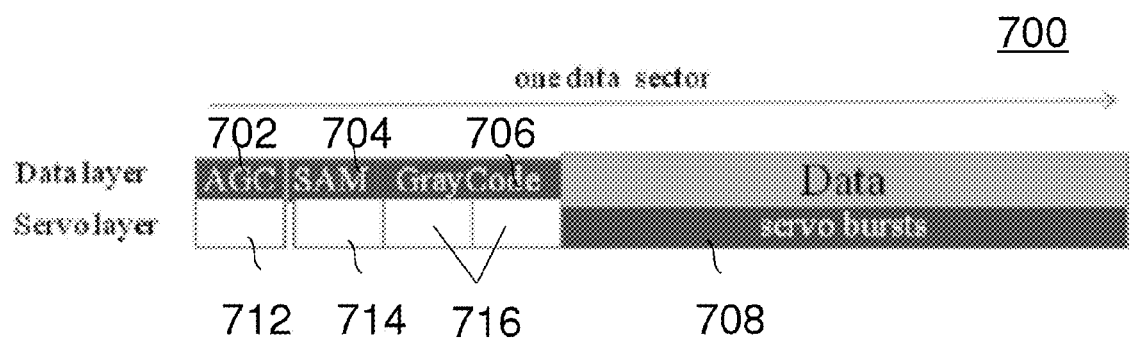
FIG. 7 is a side view of a schematic illustrating a data arrangement system according to various embodiments.

FIG. 7 shows a schematic in which the auto gain control (AGC), sector address mark (SAM), gray code are stored in the first layer or data recording layer according to various embodiments. The gray code may indicate the track number of a particular servo-track while the servo bursts may indicate how well the read/write head is following a particular servo-track. As such, the positioning accuracy may be determined only by the servo bursts. As the medium is been sampled to determine the positioning accuracy, the sampling frequency of the medium may not be affected by the gray code or AGC or SAM. The number of SAM may correspond to the number of servo sectors (or sectors).

A continuous signal comprising PES and addressing information may be provided. The AGC may have less than 80 cycles or bits, the SAM may have less than 12 cycles or bits and the gray code may have less than 24 cycles or bits. As such, the total number of cycles or bits utilized by the AGC, SAM and gray code may be equal to or less than 116 cycles or bits. Along the inner diameter of the magnetic medium, the clock of the addressing information may be 4 T and the total length of the addressing information may be 464 T. As a hard disk drive may use 4K data corresponding to 32768 T, the AGC, SAM and gray code may only occupy about 1.42% of the first magnetic layer along the inner diameter. The addressing information along the outer diameter may occupy about 2.83% along the outer diameter. On average, the addressing information may occupy about 2.12% of the first magnetic layer. If a frequency of 100MHz is utilized, the total period of addressing is less than 1.2 microseconds (µs). Accordingly, the sampling rate to generate the PES may be more than 500 kHz. Advantageously, this sampling rate is higher than the sampling rates of around 60 kHz for embedded servos.

125 sequences of addressing information, each sequence comprising AGC, SAM and grey code may be sufficient to maintain the seeking performance. Assuming an inner diameter of 15.75 mm and 1 T length of 13 nm, the addressing information in total may occupy about 0.76% along the inner diameter.

In various embodiments, a recording medium having a servo layer configured to provide at least a portion of the servo information and a data recording layer configured to record data. In various embodiments, the least a portion of the servo information is a fourth servo pattern comprising a plurality of servo bursts 708. The medium in FIG. 7 comprises a plurality of servo patterns and a plurality of segments in one sector 700 according to various embodiments. Each segment corresponds to each of the plurality of servo patterns. The plurality of servo patterns in the data layer may comprise a first servo pattern comprising an automatic gain control 702, a second servo pattern comprising a sector address mark 704 and a third servo pattern comprising a GrayCode 706. The segments 712, 714 and 716 corresponding to the first servo pattern comprising an automatic gain control 702, the second servo pattern comprising a sector address mark 704 and the third servo pattern comprising a GrayCode 706 may be left blank.

In other words, a portion of the second layer or servo layer corresponding to a portion of the first layer or data layer stored with auto gain control (AGC), sector address mark (SAM) and gray code is reserved to be blank. Advantageously, this may waste less space than the various embodiments shown in FIG. 6 because the writing frequency supported for the first magnetic layer may be higher than that for the second magnetic layer, which may suffer from spacing loss. In other words, as the density bits of the first layer or data layer may be higher than that of the second layer or servo layer as a result of spacing loss due to the second layer or servo layer further away from the read/write head, it may be more efficient to store the AGC, SAM and gray code in the first magnetic layer.

In various embodiments, a servo control system for accessing a magnetic medium according to various embodiments, the magnetic medium according to various embodiments having a data arrangement according to various embodiments comprising a pre amplifier configured to read and write simultaneously, an analog to digital converter (ADC) connected to the pre amplifier, a PES demodulator connected to the ADC, a controller and actuator system connected to the PES demodulator and a read/write head connected to the controller and actuator system, wherein the PES demodulator determines misalignment of the read/write head from the track center of the target track based on the servo bursts and generates a feedback signal to the controller and misalignment system to bring the read/write head to the track center of the target track.

The data storage device may include a memory which is for example used in the processing carried out by the data storage device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

For illustration purposes only and not as a limiting example, the term "substantially" may be quantified as a variance of +/−5% from the exact or actual. For example, the phrase "A is (at least) substantially the same as B" may encompass embodiments where A is exactly the same as B, or where A may be within a variance of +/−5%, for example of a value, of B, or vice versa.

In the context of various embodiments, the term "about" as applied to a numeric value encompasses the exact value and a variance of +/−5% of the value.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A recording medium comprising:
a servo layer; and
a data recording layer;
wherein the medium comprises a plurality of servo patterns;
wherein the plurality of servo patterns comprises:
a first servo pattern comprising an automatic gain control;
a second servo pattern comprising a sector address mark;
a third servo pattern comprising a GrayCode; and
a fourth servo pattern comprising a plurality of servo bursts;
wherein the first servo pattern, the second servo pattern and the third servo patterns are stored in the data recording layer;
wherein the fourth servo pattern is stored in the servo layer;
wherein the plurality of servo bursts forms a A/B frequency burst type: and
wherein the A and B bursts are located at different off-track positions but at the same down-track positions.

2. The recording medium according to claim 1 wherein the medium is a magnetic medium.

3. The recording medium according to claim 1 wherein the servo layer has a higher coercivity value compared to the data recording layer.

4. A data storage device comprising:
a recording medium comprising:
a servo layer; and
a data recording layer;
wherein the medium comprises a plurality of servo patterns; and
a servo control system configured to access the recording medium;
wherein the plurality of servo patterns comprises:
a first servo pattern comprising an automatic gain control;
a second servo pattern comprising a sector address mark;
a third servo pattern comprising a GrayCode; and
a fourth servo pattern comprising a plurality of servo bursts;
wherein the first servo pattern, the second servo pattern and the third servo patterns are stored in the data recording layer;
wherein the fourth servo pattern is stored in the servo layer;
wherein the plurality of servo bursts forms a A/B frequency burst type; and
wherein the A and B bursts are located at different off-track positions but at the same down-track positions.

* * * * *